United States Patent [19]

Bandy, Jr.

[11] Patent Number: 5,131,528

[45] Date of Patent: Jul. 21, 1992

[54] CONVEYOR APPARATUS WITH HYDRAULIC TENSIONING CONTROL

[75] Inventor: Clarence L. Bandy, Jr., Glade Spring, Va.

[73] Assignee: American Longwall Mining Corporation, Abingdon, Va.

[21] Appl. No.: 644,104

[22] Filed: Jan. 22, 1991

[51] Int. Cl.5 .................................. B65G 23/44
[52] U.S. Cl. ................................... 198/813
[58] Field of Search .......................... 198/813

[56] References Cited

U.S. PATENT DOCUMENTS

| | | | |
|---|---|---|---|
| 4,037,876 | 7/1977 | Georg et al. | 198/813 X |
| 4,090,601 | 5/1978 | Freed, Jr. | 198/316 |
| 4,245,739 | 1/1981 | Hartley et al. | 198/813 X |
| 4,284,192 | 8/1981 | Taylor | 198/813 |
| 4,508,213 | 4/1985 | Kelley | 198/813 |
| 5,002,177 | 3/1991 | Winning | 198/813 X |

FOREIGN PATENT DOCUMENTS

| | | | |
|---|---|---|---|
| 1578917 | 4/1969 | France | 198/813 |
| 385854 | 8/1973 | U.S.S.R. | 198/813 |
| 1063732 | 12/1983 | U.S.S.R. | 198/813 |

*Primary Examiner*—Robert P. Olszewski
*Assistant Examiner*—Cheryl L. Gastineau
*Attorney, Agent, or Firm*—King & Schickli

[57] ABSTRACT

A conveyor assembly includes an endless conveyor having ends supported by a drive drum/sprocket and an idler drum/sprocket mounted on respective portions of a split conveyor frame. The frame portions are movable with respect to each other. Dual tensioning cylinders control the movement of the portions and thus the tensioning force acting on the conveyor. A hydraulic circuit for the tensioning cylinders provides a first level of tensioning force to said conveyor upon initial start-up of the conveyor apparatus and a second reduced level of tensioning force after a predetermined time. The first level of tensioning force is sufficient to overcome the breakaway friction between the frame portions while the second level of tensioning force is sufficient for proper and sustained tension during normal operation of the conveyor. A time delay control valve in the circuit includes a movable valve element actuable by a differential hydraulic force through a combination of restrictive orifices, an accumulator, a return spring and operating faces.

13 Claims, 2 Drawing Sheets

60 TIME DELAY VALVE

CONVEYOR APPARATUS WITH HYDRAULIC TENSIONING CONTROL

TECHNICAL FIELD

The present invention relates generally to an endless conveyor apparatus for movement of aggregate material and more particularly, to an apparatus having an endless conveyor hydraulic tensioning control system to assure proper operation, and at the same time protect and extend the life of the moving components of such apparatus.

BACKGROUND OF THE INVENTION

Endless conveyor apparatus are typically used in the mining of coal and the like and incorporate chain/flight conveyors for moving the mined materials from one location to another. Because of the hostile operating environment and the bulky nature of the mined materials, such conveyor apparatus are constructed with very heavy duty materials including heavy gauge conveyor chains and flight bars. Even under the best of conditions, the various working components required to move and support the conveyor chain and flight bars, such as the drive sprockets, support shafts and bearings, are subject to considerable wear. This is due in part to the severe tension created by the weight of the chain and flights, and the forces needed to move the heavy aggregate loads.

Proper tensioning of an endless conveyor during operation is an important consideration for smooth and efficient operation, as well as minimizing wear of the components. It has long been recognized that slack in the conveyor is not desirable since it results in erratic movement and undesirable shock loading of the components, which exacerbates the wear problem. Also, under slack conditions, the chain tends to slip toward the tips of the sprocket teeth, and under severe conditions completely off the sprocket, resulting in immediate equipment failure, and losses due to equipment down time. On the other hand, too much tension in the chain also results in excessive wear of the same components due to the over stressing and strained condition of the apparatus.

One example of addressing the tension problem is found in U.S. Pat. No. 4,090,601 to Freed, which discloses a hydraulic system designed to overcome slack in an articulated conveyor system when lateral movement of a portion of the conveyor is introduced into the system. A hydraulic cylinder, which is responsive to the operating pressure of the drive motor, is operative to maintain only tension sufficient to avoid slack.

Still another U.S. Pat. No. 4,508,213 to Kelley discloses a hydraulic system for the removal of slack in an endless conveyor. The support housings/bearings on the ends of the shaft for the sprocket are shifted longitudinally through a hydraulic cylinder arrangement and a series of linkages. As the housings/bearings move, the shaft and the sprocket are moved to tension the conveyor. The tension is automatically adjusted in response to a pressure transducer. The adjustment, like in Freed '601, is performed only to the extent of maintaining constant tension during normal operation.

Neither of the two references above, or the prior art in general, recognize or address the problem associated with heavy duty conveyors of tensioning the conveyor upon initial operation resulting from at-rest or "breakaway" friction. That is, when starting a heavy duty conveyor, high initial breakaway friction retards or prevents proper movement of the adjustable components when normal operating pressure is used, thus preventing the proper tension being set in the chain or belt. A slack chain results with the attendant undesirable operation. If the pressure, on the other hand, is increased during operation sufficient to accomplish the initial tensioning, undue component stress and wear results from the overtensioning and premature failure of the system results, as described above. Thus, it is desirable to address the conveyor start-up problem associated with breakaway friction, while ensuring that proper operating tension is automatically applied to the conveyor during continued operation.

SUMMARY OF THE INVENTION

A paramount object of the present invention is to provide an improved conveying apparatus which attends to the problem of proper tensioning of the endless conveyor during operation while concurrently solving the problem of overcoming the breakaway friction of the tensioning system upon initiating operation of the apparatus.

Another object of the present invention is to provide a simple and inexpensive hydraulic circuit compatible with present industrial accepted circuits to address the breakaway friction problem of the tensioning system maintaining normal conveyor tension at acceptable levels.

Additional objects, advantages and other novel features of the invention in part will be set forth in the description that follows and in part will become apparent to those skilled in the art upon examination of the following or will be learned with the practice of the invention. Other objects and advantages of the invention may be realized and obtained by means of the instrumentalities and combinations particularly pointed out in the appended claims.

To achieve the foregoing and other objects, and in accordance with the purposes of the present invention as described herein, an improved endless conveyor apparatus is provided which comprises a frame having first and second portions movable with respect to each other, a driving element and idler or guide element for moving and supporting the ends of the conveyor, a tensioning element spanning the first and second portions for moving said first and second portions, and a hydraulic control circuit to which said tensioning element is responsive for moving said first and second portions.

The hydraulic control circuit causes the tensioning element, preferably dual hydraulic cylinders, to tension the conveyor to a first level of force upon initial start-up of the conveyor apparatus. The first level of tensioning force is sufficient to overcome breakaway friction. After a predetermined time, the control circuit causes the tensioning element to tension the conveyor to a second and reduced level of tension force. The second level of tensioning force is maintained at a level sufficient for normal operation of the conveyor apparatus and avoids over stressing the various operating components of the conveyor.

The time delay of the circuit is built into a control valve having a movable valve element actuated by a differential hydraulic force provided by a combination of restrictive orifice means, and an accumulator. Also, the hydraulic pressure acts against a differential size operating face and opposite a return spring to maintain the control valve in the normal operating mode after the specified time delay.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments and its several details are capable of modification in various, obvious aspects without departing from the invention. Accordingly, the drawing and descriptions will be regarded as illustrative in nature and not restrictive.

DETAILED DESCRIPTION OF THE PREFERRED EMBODIMENT OF THE INVENTION

Figure 1:
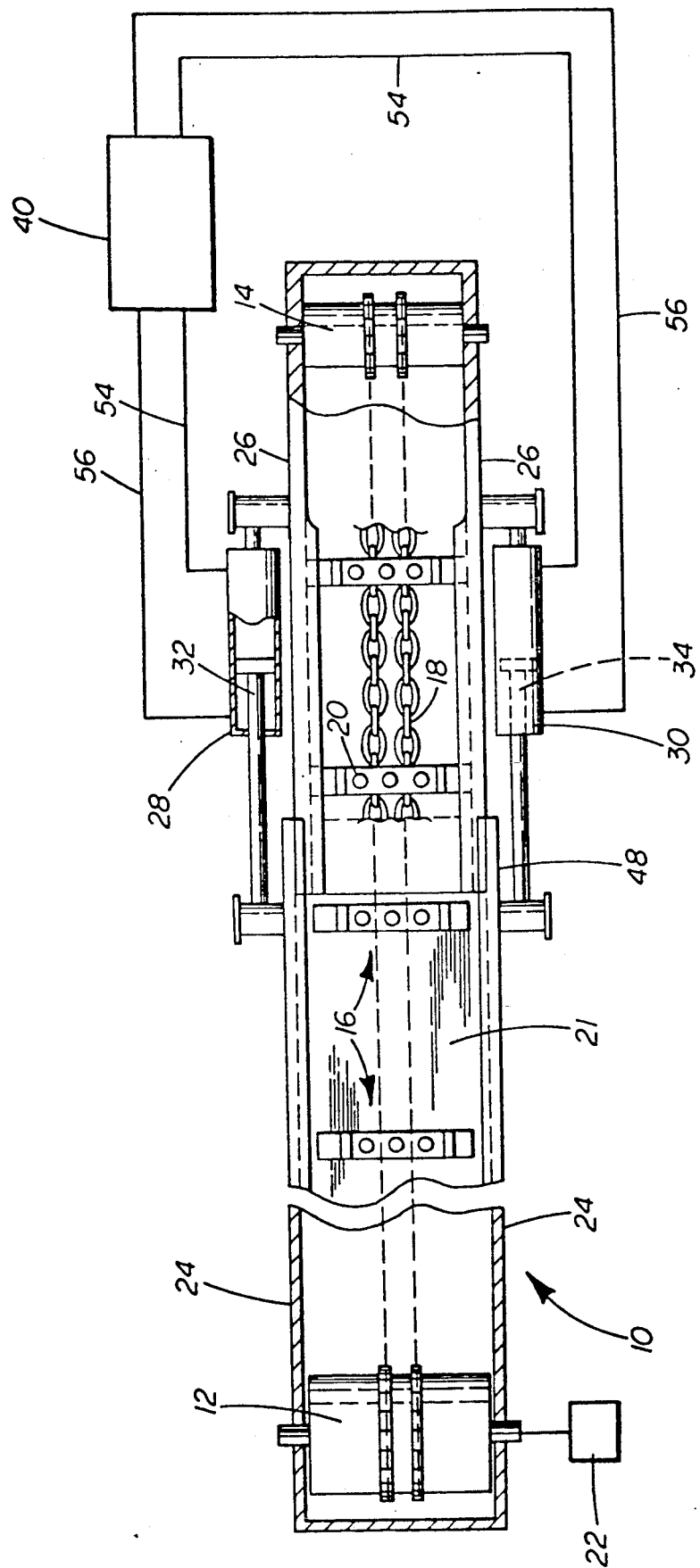
FIG. 1 is a schematic top view depicting an endless conveyor assembly with a dual hydraulic cylinder tensioning mechanism bridging movable frame sections supporting the assembly.

Reference is now made to the schematic of FIG. 1 which illustrates in simple form the various conveyor elements necessary for understanding of the conveyor equipment environment in which the present invention operates. Conveyor apparatus or assembly is shown generally by the character numeral 10 and includes a drive drum/sprocket 12 and an idler or guide drum/sprocket 14 separated by a span of flexible conveyor 16, illustrated partially in dashed line outline. As depicted, the conveyor 16 comprises dual conveyor chains 18 and a multiplicity of spaced flight bars 20 attached to the dual chains 18. During operation of the conveyor assembly, the flight bars 20 push aggregate material, such as mined coal, along an underlying conveyor pan 21. The conveyor assembly 10 is typically positioned juxtaposed to a mine wall where a seam of material is being mined for transporting the material to one end. The material is then transferred to a moving takeaway conveyor or mobile vehicle for further disposition.

The drum/sprocket 12 is appropriately coupled to a conveyor drive motor 22. Operation of motor 22 causes the sprocket intermeshing with the dual chains 18 to advance the conveyor 16. A pair of sidewalls 24 forming a first portion of the "split frame" of conveyor assembly 10 serve to rotatably support the drum/sprocket 12. The sidewalls 24 are illustrated as being telescopingly engaged with a second pair of sidewalls 26 forming a second portion of the frame and, collectively with side walls 24, comprise the aforementioned split frame. The telescoping joint, indicated generally by character numeral 48, permits the frame portions to be moved relative to one another.

It will be understood by those skilled in this art that the split frame could be manifested in many forms. For purposes of clarity herein, however, the precise structure permitting movement is not described, as such discussion is not deemed necessary for an understanding of the present invention. Thus, the first and second frame portions are described as simply being movable relative to one another at the telescoping joint 48 to show a preferred embodiment with the understanding that other forms may be utilized in accordance with the broader aspects of the present invention.

The idler drum/sprocket 14 is appropriately mounted for rotary movement between side walls 26. Relative movement at the joint 48 between the adjacent side walls 24 and 26 thus causes the distance span between the drum/sprockets 12 and 14 to vary accordingly. The dual conveyor chains 18 can be provided with increased or reduced tension depending upon the direction of adjusting movement of the supporting drum/sprockets with respect to each other. To provide this relative movement, assembly 10 has a pair of hydraulic cylinders 28 and 30, each mounted on and secured to a adjacent side wall 26. The cylinders have respective pistons 32 and 34, each of which are operatively coupled to a side wall 24 in any known and expedient manner.

Movement of the pistons 32 and 34 causes the first portion of the conveyor 16 represented by the side walls 24 to move longitudinally relative to the second portion and side walls 26, thus relaxing or tensioning the chain 18, as desired. Control of movement of pistons 32 and 34 is effected by a hydraulic tensioning control circuitry, depicted generally by numeral 40 in FIGS. 1 and 2. The operation of conveyor assembly 10 is preferably automatically integrated with the control of piston movement. That is, starting of motor 22 can and preferably does initiate the sequence of desired actions by the hydraulic tensioning control system 40, as described below.

As stated above, a certain amount of tensioning of conveyor chain 18 is essential for the proper and efficient operation of the conveyor assembly 10. Too little tension may cause the conveyor chain to ride up the teeth of the sprockets, and even eventually, under severe conditions become disengaged. Conversely, too much tension may cause the conveyor components to be over stressed, increasing the risk of mechanical failure in the various parts of the conveyor apparatus.

Figures 2, 2A:
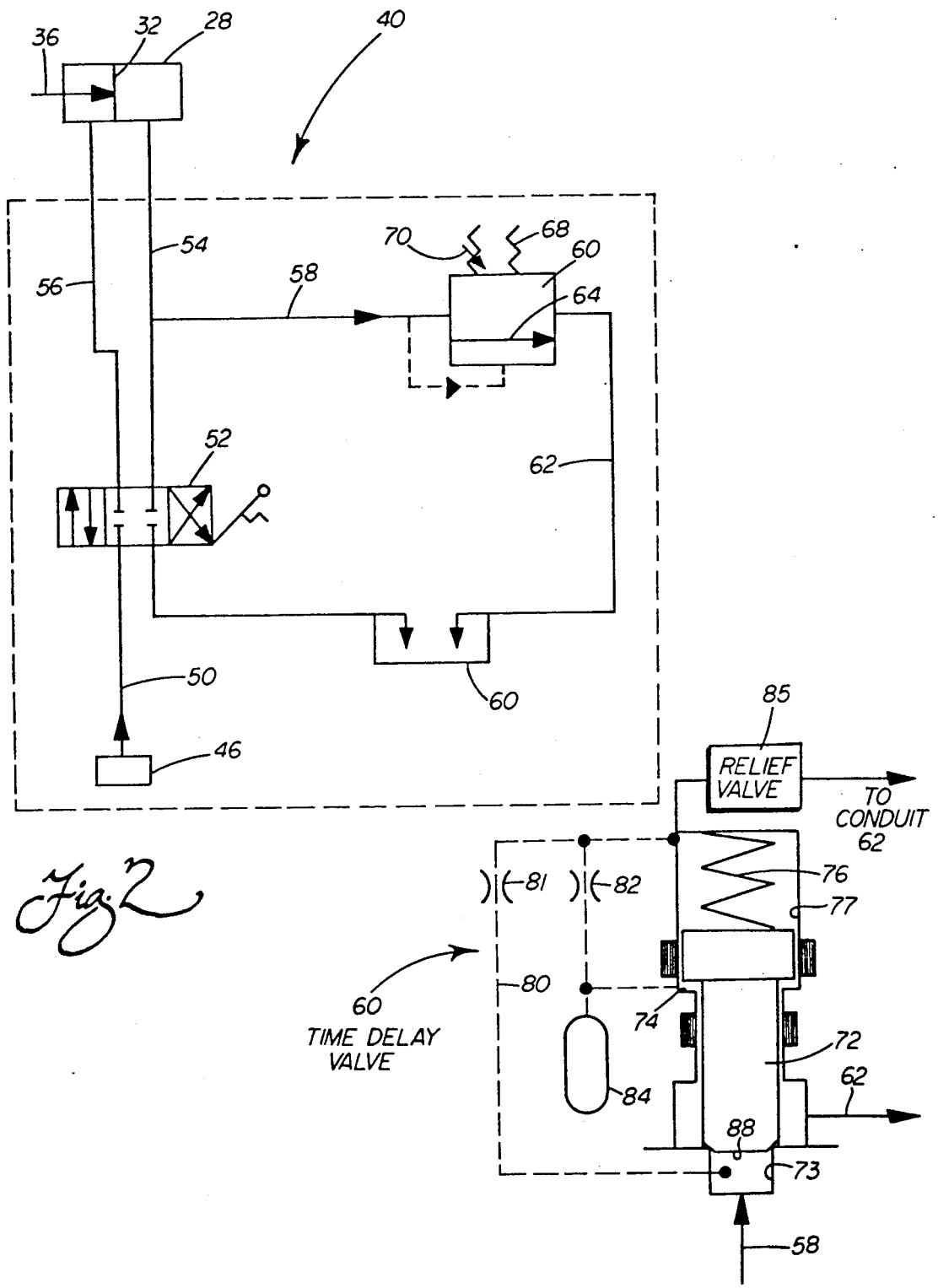
FIG. 2 is a schematic showing of a hydraulic tensioning control system incorporating various elements of the present invention.
FIG. 2a is a schematic illustration of a preferred control valve and representative of one approach capable of providing the time delay for carrying out the objectives of the invention.

Reference is now made to FIG. 2 for a more detailed explanation of the operation of the control circuit 40 in accordance with the principles of the present invention. Pressurized hydraulic fluid is provided by hydraulic pump 46 through conduit 50 to main operating control valve 52. To simplify the description, only the cylinder 28 is illustrated in FIG. 2; it being understood that the cylinder 30 is connected in parallel, as illustrated in FIG. 1. Depending upon the position of the valve 52, which may take the form of a convention spool valve, pressurized fluid may be directly provided through conduit 54 by shifting the valve element to the left in FIG. 2. This action pressurizes the right side of the head of pistons 32, 34, i.e., the "tensioning side" of cylinders 28, 30 is pressurized to cause pistons 32, 34 to move to the left, and in turn, moving the split frame portions of the conveyor assembly 10 and drum/sprockets 12 and 24, further apart. This movement apart increases the tension force acting on the dual conveyor chains 18. The opposite side of the pistons 32, 34 is simultaneously exhausted through conduit 56 to sump 60 (see FIG. 2).

Pressure on the retracting side of the cylinders 28, 30 and simultaneous exhausting of the tensioning side, by shifting the spool element of the valve 52 all the way to the right causes the converse to occur, i.e., retracting the pistons 32, 34 and reducing the tension force acting on the conveyor assembly 16. As is apparent, with the spool element in the center position as shown, movement in either direction is blocked, and the conveyor assembly 10 is in the inoperative or shut-down mode.

According to the invention, the pressurized fluid in conduit 54 also proceeds by branch conduit 58 to hydraulically operated, time-delay control valve 60, which is initially biased into a closed position; the depicted situation in FIG. 2. In the opposite, or open position, some pressurized fluid is allowed to go directly via conduit 62 to the sump 60.

The closed position of the valve 60 occurs when fluid passage, indicated by action arrow 64, is cut off to conduit 62. In this mode, maximum pressure is being delivered to the tensioning side of the cylinders 28, 30. The valve 60, on the other hand, when open, serves to reduce the pressure of the fluid to the tensioning side of cylinder 28 thereby decreasing the tension of the conveyor 16. As illustrated in FIG. 2, the valve 60 is normally closed by the combined bias of spring 68 and hydraulic pressure (see action arrow 70). However, after a predetermined time period, determined by the desired interval for breakaway of the conveyor portions, the line pressure build-up exerted against valve 60 causes it to open against the bias. This action thus reduces the tensioning force by bypass of the desired portion of the fluid via the conduit 62 to the sump 60 and establishment of the normal operating pressure and normal, reduced conveyor tension.

A preferred embodiment of the time delay control valve 60 is shown in FIG. 2a. In the schematic illustration, a valve element 72 is positioned in a valve housing having multiple operating chambers 73, 74 tending to open the valve to connect the branch conduit 58 with the conduit 62. The return spring 68 having a relatively light compressive force and a third operating chamber 77 tend to force the valve element 72 to the seated position in the first operating chamber 73.

A bypass line 80 including a first restrictive orifice 81 feeds pressurized fluid to the third operating chamber 77 on the side of the valve element 72 opposite the first and second chambers 73, 74. A second restrictive orifice 82 feeds the same hydraulic fluid by a series connection to an accumulator 84 which serves to provide a time delay for feeding of hydraulic fluid to the second operating chamber 74. A relief valve 85 connects to the line 80 and is set at a selected lower pressure to balance the forces on the valve element 72, which are predetermined to provide the second level of force to the cylinders 28, 30.

The branch conduit 58 initially provides full pressure force to primary, central portion of differential operating face 88 of the valve element 72. Simultaneously, the bypass line 80 operating through restricted orifices 81, 82 is filling the accumulator 84 and the chambers 74, 77. After the time required to fill the accumulator is passed, the second operating chamber 74 is provided with sufficient full force pressure when combined with the pressure in the chamber 73 to then overcome the lower level fluid pressure in the third operating chamber 77 coupled with the return spring force of the spring 76. At this point, the valve element 72 lifts from its seat in the first operating chamber 73 opening the passage to the conduit 62.

The operating face 88 of the valve element 72 also includes champhered peripheral, secondary portion thereby providing the differential operating characteristic. Thus, once the valve element 72 is lifted from the seat, then the full operating face 88 is exposed to the pressure in conduit 58, assuring that the valve element 72 is held in the open position during the normal operating cycle of the circuit 40.

As mentioned above, this operative sequence of the valve 60 of hydraulic tensioning control circuit 40 is preferably initiated upon the energization of the main conveyor drive through the motor 22. If desired, however, the system may be actuated manually upon the start of the conveyor drive.

Thus, in operation upon initiation of a conveying sequence, the valve 52 connects the full pressure generated by the pump 46 directly to the tensioning side of the cylinders 28, 30. Full pressure may be approximately 4500 psi, which is proven effective to move or shift the drum/sprockets 12 and 14 further apart, providing the first level or breakaway tensioning force on the conveyor chains 18. While the 4500 psi level is suitable when the apparatus of the present invention is applied, for example to an armored face conveyor in a coal longwall mining machine, the precise pressure required depends upon the particular nature of the conveying assembly.

After the predetermined time period, preferably on the order of about two seconds, the delay valve 60 opens diverting the set or predetermined portion of the pressurized fluid to the sump 60. This immediately reduces the pressure on the tensioning side of the dual cylinders 28, 30 which in turn allows the drum/sprockets 12 and 14 to move closer, providing a second and reduced level of tensioning force on the conveyor chains 18. It has been found that a preferred operating pressure within the cylinders of about 3050 psi is suitable to maintain the proper tension force for sustained operation of the conveyor assembly 10; again, when the inventive concept is used in conjunction with an armored face conveyor. It should be understood, however, that the precise sustaining level for other applications depends upon the nature of the conveying assembly and the operating circumstances.

Thus, it may now be understood that the high initial breakaway friction which retards or prevents proper initial movement of the adjustable conveyor components can be overcome by the use of the hydraulic control circuitry 40 of the present invention. Concurrently, the proper tensioning needed for normal operation is quickly reached following the initial start-up mode.

The foregoing description of a preferred embodiment of the invention is solely for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A conveyor apparatus including an endless conveyor comprising
   a frame having first and second portions movable with respect to each other;

drive means and guide means for supporting the ends of the conveyor and rotatably mounted on said first and second portions of said frame, respectively;

tensioning means mounted on said frame spanning the first and second portions to move said first and second portions to move said drive means and said guide means with respect to each other; and a control circuit for said tensioning means for applying a first level of tensioning force sufficient to overcome breakaway friction during initial start-up of said conveyor and a second level of lower force during operation after a time interval substantially defined by the breakaway of said portions to maintain operational tension;

whereby providing proper initial tensioning, as well as smooth and efficient normal operation, is assured.

2. The conveyor apparatus of claim 1 wherein said tensioning means includes hydraulic cylinder means and said control circuit includes a hydraulic power source and valve means to switch between said first level of force and said second level.

3. The conveyor apparatus of claim 2, wherein said valve means in said control circuit switches independently of the speed of the conveyor.

4. The conveyor apparatus of claim 1, wherein said conveyor comprises a chain.

5. A conveyor apparatus including an endless conveyor comprising a frame having first and second portions movable with respect to each other;

drive means and guide means for supporting the ends of the conveyor and rotatably mounted on said first and second portions of said frame, respectively;

tensioning means mounted on said frame spanning the first and second portions to move said first and second portions to move said drive means and said guide means with respect to each other; and a control circuit for said tensioning means for applying a first level of tensioning force sufficient to overcome breakaway friction during initial start-up of said conveyor and a second level of lower force during operation to maintain operational tension;

said tensioning means including hydraulic cylinder means and said control circuit including a hydraulic power source and valve means to switch between said first level of force and said second level;

said valve means including a time delay control valve to switch from said first level of force to said second level after a predetermined time period;

whereby providing proper initial tensioning, as well as smooth and efficient normal operation, is assured.

6. The conveyor apparatus of claim 5 wherein said predetermined time delay is approximately two seconds.

7. The conveyor apparatus of claim 5 wherein said first and second levels of force are provided by said power source utilizing hydraulic pressure acting initially at approximately 4,500 psi and at approximately 3,050 psi.

8. The conveyor apparatus of claim 5 wherein said time delay control valve is hydraulically operated.

9. The conveyor apparatus of claim 8 wherein the power for operating said control valve includes said hydraulic power source and a return spring.

10. The conveyor apparatus of claim 8 wherein said control valve of said control circuit includes a movable valve element actuable by differential hydraulic force over said predetermined time period.

11. The conveyor apparatus of claim 10 wherein said control circuit includes restrictive orifice means and accumulator means connected in series to move the valve element after the time delay.

12. The conveyor apparatus of claim 11 wherein said valve element includes primary and secondary operating face portions, said secondary face portion being exposed to pressurized fluid only after initial opening of said valve and being of sufficient area to assure maintenance of the open condition of the valve during operation under said second level of force.

13. The conveyor apparatus of claim 5 wherein said first and second levels of force are provided by said power source utilizing hydraulic pressure acting initially at approximately 4,500 psi and at approximately 3,050 psi after start-up.

* * * * *